(No Model.)
J. B. MICHENER & T. L. VARNS.
SAW MILL DOG.
No. 289,016. Patented Nov. 27, 1883.
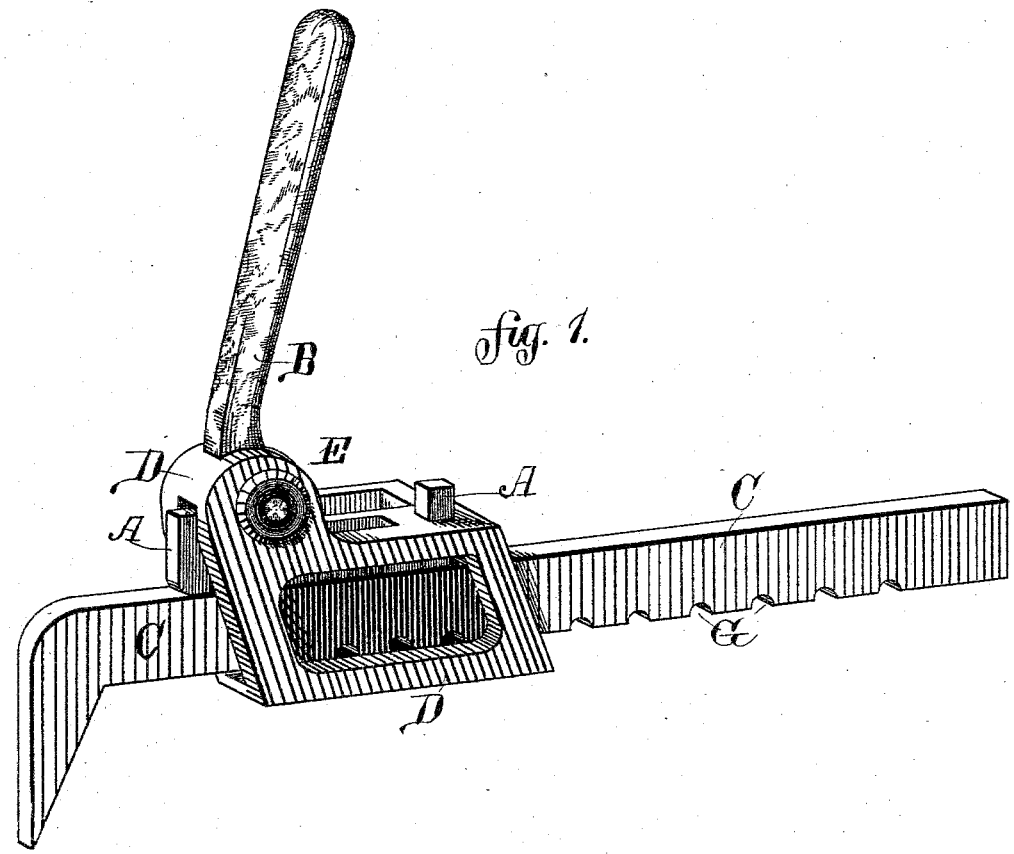
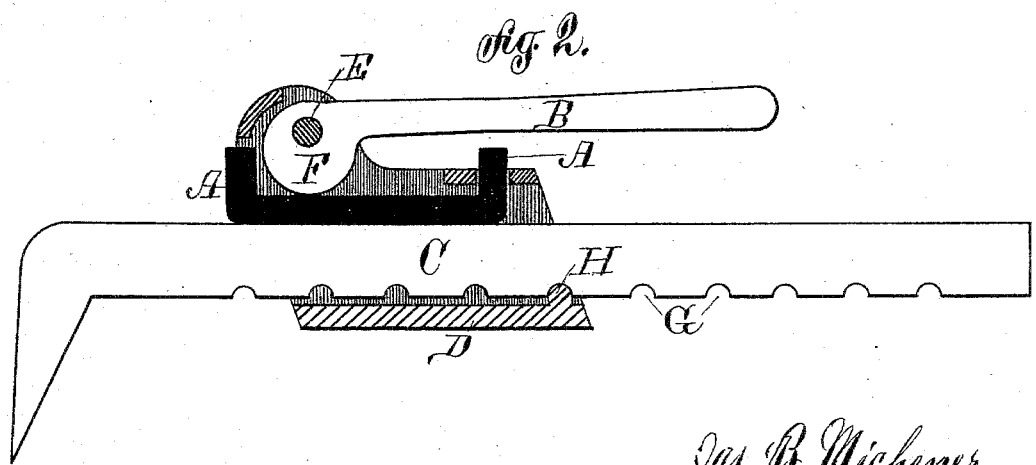
Witnesses:
C. E. Adamson
J. A. Adamson
Jas. B. Michener
Tobias L. Varns
Inventors.
By Chas. E. Adamson
Atty.

UNITED STATES PATENT OFFICE.

JAMES B. MICHENER AND TOBIAS L. VARNS, OF KOKOMO, INDIANA; SAID VARNS ASSIGNOR TO SAID MICHENER.

SAW-MILL DOG.

SPECIFICATION forming part of Letters Patent No. 289,016, dated November 27, 1883.

Application filed April 30, 1883. (No model.)

*To all whom it may concern:*

Be it known that we, JAMES B. MICHENER and TOBIAS L. VARNS, citizens of the United States, residing at Kokomo, in the county of Howard and State of Indiana, have invented a new and useful Improvement in Saw-Mill Dogs, of which the following is a specification.

Our invention relates to improvements in Letters Patent No. 232,924, issued to Elwood Bennett, October 5, 1880, and in similar saw-mill dogs.

The object of our improvement is to provide a movable metallic bar to work between the eccentric and dog, instead of having the eccentric working directly against the upper surface of the dog. We attain these objects by the mechanism illustrated by the accompanying drawings, in which—

Figure 1 is a perspective view of a saw-mill dog containing our improvement; and Fig. 2 is a longitudinal section of the same.

Similar letters refer to similar parts throughout the several views.

Heretofore saw-mill dogs similar to that patented by Elwood Bennett were so constructed that the eccentric F came in direct contact with the back or upper surface of the dog C. That method is very imperfect and objectionable, from the fact that the eccentric soon wears off the back of the dog with which it comes in contact, so as to render it inoperative and useless. To avoid this wearing and the expense of replacing the worn-out dog with a new one, we have provided a metallic bar, A, having each end turned up or outward, as shown in the drawings. The bar A is made of suitable metal, and placed between the eccentric F and dog C, one end extending up through the sleeve D, as shown. The bar A may be turned end for end when it becomes worn, and when entirely worn out it can be replaced by a new one at a nominal expense comparatively with the expense of a dog C. When the eccentric lever B is pressed down, the bar A also serves to strengthen the dog C, as well as preventing any wearing upon it, as shown in Fig. 2.

The parts of the dog B, C, D, E, F, and G, shown in connection with our improvement are all common, and described in the patent to Bennett, as heretofore stated.

Having thus described our invention, we claim the following, and desire to secure the same by Letters Patent:

In a saw-mill dog, a movable metallic bar located between the eccentric and the back of the dog, substantially as and for the purpose set forth.

JAMES B. MICHENER.
TOBIAS L. VARNS.

Witnesses:
J. G. GERMAN,
M. E. ELDER.